United States Patent [19]

Cerefice et al.

[11] 3,878,155

[45] Apr. 15, 1975

[54] DIEPOXIDES OF 1,2-DIHYDROPHTHALATE

[75] Inventors: Steven A. Cerefice, Naperville, Ill.; Ellis K. Fields, River Forest, Ill.

[73] Assignee: Standard Oil Company, Chicago, Ill.

[22] Filed: Nov. 23, 1973

[21] Appl. No.: 418,371

[52] U.S. Cl. .................. 260/30.4 R; 260/348 C
[51] Int. Cl. ............................................. C08f 45/32
[58] Field of Search... 260/30.4 R, 31.8 C, 31.8 DB, 260/348 C

[56] References Cited

UNITED STATES PATENTS

| | | | |
|---|---|---|---|
| 2,794,030 | 5/1957 | Phillips et al. | 260/30.4 R X |
| 2,963,490 | 12/1960 | Rowland et al. | 260/30.4 R X |

*Primary Examiner*—Lewis T. Jacobs
*Attorney, Agent, or Firm*—William H. Magidson; Arthur G. Gilkes; William T. McClain

[57] ABSTRACT

1,2-dihydro-3,4:5,6,-dioxyphthalates and plasticization of resinous polymers of vinyl chloride with said 1,2-dihydro-3,4:5,6-dioxyphthalates.

5 Claims, No Drawings

DIEPOXIDES OF 1,2-DIHYDROPHTHALATE

This invention relates to 1,2-dihydro-3,4:5,6-dioxyphthalates.

There has been considerable interest in the use of epoxys. For example, epoxidized glyceride oils and tri(2,3-epoxypropyl) phosphites have been used as stabilizers and/or plasticizers of resinous polymers of vinyl chloride. Reaction products of Bisphenol A and epichlorohydrin have been used as adhesives, surface coatings, intermediates in the production of polyesters, etc. For the most part, these products have had great acceptance. However, there is a demand for new epoxys having the same or similar general properties which permit the avoidance of defects in the use of the present epoxys of commerce. For example, when the oxirane rings of epoxidized glyceride oils in polyvinyl chloride compositions open on extended aging due to reaction with hydrochloric acid given off by polyvinyl chloride, the ring opened glyceride oils tend to exude from the polyvinyl chloride. Although this is not a problem initially, it is sometimes a serious problem several years after fabrication. Accordingly, there is a need for new epoxy monomers.

The general object of this invention is to provide a new class of epoxy compounds. Another object of this invention is to provide new plasticized resinous polymers of vinyl chloride. Other objects appear hereinafter.

We have now found that 1,2-dihydro-3,4:5,6-dioxyphthalates constitute a new class of epoxy compounds. These compounds can be used as rust inhibitors, plasticizers, comonomers in the production of polyester resins (e.g. by reacting the dioxyphthalates with polycarboxylic acid compounds either before or after opening the oxirane rings), cross-linkers for epoxy resins, hydroxyl-containing polymers (e.g. starch, polyvinyl alcohol, etc.) acid containing polymers (carboxymethylcellulose, maleic anhydride copolymers, (meth)acrylic acid polymers, etc.) etc. Present studies indicate that the 1,2-dihydro-3,4:5,6-dioxyphthalates may have better long term compatability than epoxidized glyceride oils in polyvinyl chloride since phthalates (conventional P.V.C. plasticizers) have better P.V.C. compatibility than glyceride oils.

Briefly, the 1,2-dihydro-3,4:5,6-dioxyphthalates can be prepared by reacting a 1,2-dihydrophthalate with a peracid.

The 1,2-dihydrophthalates suitable for producing the 1,2-dihydro-3,4:5,6-dioxyphthalates of this invention include the alkyl esters of 1,2-dihydrophthalic acid containing from 1 to 24 carbon atoms in each alkyl group, such as the dimethyl ester, the diethyl ester, the di-n-propyl ester, the di-isopropyl ester, the di-butyl ester, the di-(n-octyl) ester, the di(2-ethylhexyl) ester, the di-(n-tridecyl) ester, the distearyl ester, the ditetracosyl ester, the n-butyl 2-ethylhexyl ester, the di-omega chloro-n-octyl ester, etc.; dialkenyl esters containing from 2 to 24 carbon atoms in each alkenyl group, such as the divinyl esters, the diallyl esters, the dioleyl esters, etc; the diaryl esters containing from 6 to 24 carbon atoms, such as diphenyl, di(toluyl), the di-(octadecylphenyl) ester, aralkyl esters containing from 7 to 25 carbon atoms, such as the benzyl ester, chlorobenzyl ester, etc.; mixed esters of two or more of the above types such as the benzyl octyl ester, etc.

The 1,2-dihydrophthalate esters can be produced by reacting the appropriate 1,2-dihydrophthalic acid compound (free acid, acyl halide or anhydride) with a suitable monohydroxy compound at a temperature of 60° to 200°C. or the dimethyl ester can be produced first and the appropriate diester produced by transesterification with a suitable monohydroxy compound at a temperature of 60° to 200°C.

Suitable monohydroxy compounds useful for producing the 1,2-dihydrophthalates include alcohols containing from 1 to 24 carbon atoms such as methyl alcohol, ethyl alcohol, isopropyl alcohol, allyl alcohol, methallyl alcohol, n-butyl alcohol, n-hexyl alcohol, n-octyl alcohol, 2-ethylhexyl alcohol, decyl alcohol, tridecyl alcohol, stearyl alcohol, oleyl alcohol, tetracosyl alcohol; aromatic hydroxy compounds containing from 6 to 24 carbon atoms, such as phenol, cresol, para-stearylphenol, naphthol, etc., benzyl alcohol, etc.

These esters can be produced under conventional reaction conditions by reacting from about 1 to 10 moles of monohydroxy compound per carboxyl equivalent of said dihydrophthalic acid compound to form a solution of ester and monohydroxy compound. If desired esterification catalysts or transesterification catalysts can be used, such as sulfuric acid, phosphoric acid, para toluene sulfonic acid, benzene sulfonic acid, stannous octoate, boron trifluoride etherate, tetralkyl titanates and zirconates of U.S. Pat. No. 3,056,818, etc.

Suitable peracids useful in this invention include peracetic acid, meta-chloroperbenzoic acid, perbenzoic acid, perpropionic acid, etc. In general, the peracid is used in a concentration of at least 2 moles of peracid per mole of 1,2-dihydrophthalate ester. In those cases where the ester is an alkenyl ester sufficient peracid is used to epoxidize the alkenyl unsaturation.

In somewhat greater detail, the 1,2-dihydro-3,4:5,6-dioxyphthalates of this invention can be prepared by reacting the 1,2-dihydrophthalate with at least 2 moles of peracid in a suitable solvent at a temperature of 0° to 80°C. Usually the 1,2-dihydrophthalate is dissolved in an inert solvent to form a 1 to 50 percent by weight solution, preferably 5 to 30 percent by weight solution. The peracid is then generally added as a 1 to 50 percent by weight solution to the dissolved 1,2-dihydrophthalate. The composition is stirred with or without heating until the reaction is complete and then isolated by conventional means.

Suitable solvents include hydrocarbons such as benzene, toluene, xylene, hexane; halohydrocarbons such as chloroform, carbon tetrachloride, 1,1,1-trichloroethane, etc.

The 1,2-dihydro-3,4:5,6-dihydroxyphthalates are effective plasticizers for resinous polymers of vinyl chloride. These esters can be used in a concentration of from about 5–300 parts by weight per 100 part by weight resinous polymer of vinyl chloride, i.e. in a plasticizing concentration. They may be used as the sole plasticizers, two or more esters may be employed together or alternatively, these esters may be used in conjunction with other conventional plasticizers such as dioctylphthalate, trioctylphosphite, epoxidized glyceride oils, etc.

The 1,2-dihydro-3,4:5,6-dioxyphthalate diester plasticizers include dialkyl esters of 1,2-dihydro-3,4:5,6-dioxyphthalic acid containing from 1 to 24 carbon atoms in the alkyl groups, preferably 3 to 13 carbon atoms, diaryl esters containing from 6 to 24 carbon atoms in the aryl groups; diaralkyl esters containing from 7 to 24 carbon atoms in the aralkyl groups; di-(vic-epoxyalkyl) esters containing from 2 to 24 carbon atoms, etc. mixed esters containing residues of two types, etc. Suitable esters include the dimethyl ester, diethyl ester, di(epoxypropyl) ester, di-n-butyl ester, di-n-octyl ester, di-2-ethylhexyl ester, ditridecyl ester, dioctadecyl ester, di-tetracosyl ester, diphenyl ester, dibenzyl ester, di-(p-cresyl) ester, benzyl n-octyl ester, di-(p-octadecylphenyl) ester, etc.

For the purpose of this invention the term "resinous polymer of vinyl chloride" includes homopolymers of vinyl chloride, copolymers of vinyl chloride and vinyl acetate, such as the conventional 95–5 vinyl chloride/vinyl acetate copolymers, partially hydrolyzed vinyl chloride/vinyl acetate copolymers, vinyl acetate/vinyl chloride/alpha, beta-ethylenically unsaturated- alpha, beta-dicarboxylic acid copolymers (such as the butyl half ester of maleic acid or dioctyl fumarate ester, etc.) etc., wherein at least 50 mole percent of the polymer constitutes vinyl chloride units.

The plasticized resinous polymers of vinyl chloride can be compounded with stabilizers, such as the organotins, barium/cadmium soaps, polyhydric alcohols, etc.; lubricants, such as fatty acids; pigments, such as zinc oxide, antimony oxide, etc. and fabricated by conventional means into films, sheets, fibers, tubes, etc.

The following examples are merely illustrative.

EXAMPLE 1

Fifty grams of a mixture of 95 percent by weight 1,2-dihydrophthalic acid and 5 percent by weight phthalic acid was added to 500 milliliters methanol containing 40 milliliters $BF_3.Et_2O$ in a 2,000 milliliter flask equipped with a heating mantel, stirrer and reflux condenser. The reactants were refluxed at about 65°C. for 24 hours. The reaction mixture was diluted with 250 milliliters water and the products extracted with 500 milliliters benzene. The insoluble portion was distilled through a Vigreaux column, yielding a center-cut fraction of 47.5 grams boiling at 82°–84°C. at 1.0 millimeters pressure, which consisted of approximately 97.5 percent dimethyl 1,2-dihydrophthalate, 1 percent by weight dimethyl 1,4-dihydrophthalate, and 1.5 percent by weight dimethylphthalate.

Six and one-half grams of the dimethyl esters prepared in the preceding paragraph were dissolved in 50 milliliters chloroform in a 500 milliliter flask equipped with a heating mantle, stirrer and reflux condenser. A solution of 13.5 grams of 85 percent meta-chloroperbenzoic acid in 200 milliliters chloroform was added to the solution and refluxed for 4 hours. The excess meta-chlorobenzoic acid and meta-chloroperbenzoic acid were removed by extraction with 60 milliliters of 5 percent sodium bicarbonate. Analysis of the products by gas chromatography showed a 13:1 mixture of isomeric diepoxys, indicating a 98 percent yield based on the 1,2-dihydrophthalate ester. After the crude product was dissolved in 20 milliliters warm carbon tetrachloride, 10 milliliters hexane were added. The solution was cooled slowly to 0°C., filtered, yielding 4.7 grams of a white solid having a melting point of 97° to 100°C. A second recrystallization from carbon tetrachloride/hexane (5:1) gave a product 99.8 percent pure melting at 104°–105°C.

EXAMPLE 2

Example 1 was repeated with essentially the same results except that 6.0 grams of a mixture of dimethyl esters was dissolved in 30 milliliters benzene and 0.40 millimoles of perbenzoic acid in 165 milliliters of benzene was added and the solution was stirred at room temperature for 18 hours. The yield of diepoxide was 97 wt. percent, based on the starting 1,2-dihydrophthalate ester.

EXAMPLE 3

A series of dialkyl 1,2-dihydro-3,4:5,6-dioxyphthalate esters were prepared by the method of Example 1 except that the boron trifluoride etherate catalyst was replaced with 1 to 3 parts by weight para-toluene sulfonic acid catalyst, and the alcohols used to produce the starting ester were respectively (a) methanol, (b) isopropyl alcohol, (c) hexyl alcohol, (d) 2-ethylbutanol and (e) 2-ethylhexanol. In all cases there were 90 percent yields of the desired epoxidized diester.

EXAMPLE 4

This example illustrates the plasticization of polyvinyl chloride with the diepoxys of this invention. One hundred parts by weight polyvinyl chloride (GEON 102 EP), 60 parts by weight dioctylphthalate, 5 parts by weight of the di-2-ethylhexyl 1,2-dihydro-3,4:5,6-dioxyphthalate, 2 parts by weight barium/cadmium soap, 1 part by weight zinc soap, and 0.4 parts by weight stearic acid were blended in a Hobart mill, melted on a rubber mill at 320°F. and molded into 6 × 6 × 0.20 inch slabs at 1,000 psi pressure and 345°F. for 8 minutes. After being conditioned, the sheet had a 2,044 psi tensile strength, 990 psi 100 percent modulus, and 370 percent elongation.

This example was repeated using 40 parts by weight of the di-2-ethylhexyl 1,2-dihydro-3,4:5,6-dioxyphthalate ester plasticizer as the sole plasticizer in the composition. After being conditioned, the sheet had a 3,763 psi tensile strength, 3,055 psi 100 percent modulus, and 265 percent elongation.

The above data indicates that the esters of this invention are good plasticizers for resinous polymers of vinyl chloride.

We claim:

1. A composition comprising a resinous polymer of vinyl chloride containing at least 50 mol percent vinyl chloride units and a plasticizing concentration of a 1,2-dihydro-3,4:5,6-dioxyphthalate diester wherein the ester groups are selected from the class consisting of alkyl groups containing from 1 to 24 carbon atoms, aryl groups containing from 6 to 24 carbon atoms, aralkyl groups containing from 7 to 24 carbon atoms, vic-epoxyalkyl groups containing from 2 to 24 carbon atoms and mixtures thereof.

2. The composition of claim 1, wherein said 1,2-dihydro-3,4:5,6-dioxyphthalate is a dialkyl ester containing from 1 to 24 carbon atoms in each alkyl group.

3. The composition of claim 2, wherein each alkyl group is a 2-ethylhexyl group.

4. The composition of claim 1, wherein said 1,2-dihydro-3,4:5,6-dioxyphthalate is a di-(vic-epoxypropyl) ester.

5. The composition of claim 1, wherein said 1,2-dihydro-3,4:5,6-dioxyphthalate comprises from 5 to 300 parts by weight per 100 parts by weight resinous polymer of vinyl chloride.

* * * * *